United States Patent
Ueno

(10) Patent No.: US 7,142,380 B2
(45) Date of Patent: Nov. 28, 2006

(54) MAGNETIC RECORDING/REPRODUCING APPARATUS AND MAGNETIC RECORDING/REPRODUCING METHOD

(75) Inventor: Hiroaki Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/042,578

(22) Filed: Jan. 24, 2005

(65) Prior Publication Data

US 2006/0056089 A1    Mar. 16, 2006

(30) Foreign Application Priority Data

Sep. 13, 2004    (JP) .............................. 2004-265994

(51) Int. Cl.
*G11B 5/09*    (2006.01)
(52) U.S. Cl. ....................................................... 360/46
(58) Field of Classification Search ................ 360/39, 360/75, 48, 46, 25, 67, 69, 77.03; 324/210
See application file for complete search history.

(56) References Cited

U.S. PATENT DOCUMENTS

| | | | |
|---|---|---|---|
| 5,602,688 A * | 2/1997 | Yokoyama et al. ........... 360/69 |
| 6,754,015 B1 * | 6/2004 | Erden et al. ................... 360/25 |
| 6,894,488 B1 * | 5/2005 | Kikugawa et al. ........... 324/210 |
| 6,963,459 B1 * | 11/2005 | Sakai ........................... 360/46 |
| 6,975,469 B1 * | 12/2005 | Sakai ........................... 360/46 |
| 2002/0089773 A1 * | 7/2002 | Shimomura et al. ........... 360/67 |
| 2002/0114099 A1 * | 8/2002 | Nakayama ............... 360/77.03 |
| 2002/0131191 A1 | 9/2002 | Osafune |
| 2005/0024759 A1 * | 2/2005 | Sakai et al. ................... 360/48 |

FOREIGN PATENT DOCUMENTS

| JP | 6-259702 | 9/1994 |
|---|---|---|
| JP | 2001-209901 | 8/2001 |
| JP | 2004-213896 | 7/2004 |

* cited by examiner

*Primary Examiner*—Fred F. Tzeng
(74) *Attorney, Agent, or Firm*—Greer, Burns & Crain, Ltd.

(57) ABSTRACT

Data is read out from a disk in which the data is recorded in the perpendicular magnetic recording system by a head, amplified by a head preamplifier, and signal-processed by a read channel LSI. A read-out processing unit of a HDD controller sends out signals processed by the read channel LSI as an output of the perpendicular magnetic recording system. Further, a cut-off frequency controlling unit of the HDD controller determines a cut-off frequency of a high-pass filter of the head preamplifier based on a data transfer rate read out by the read-out processing unit, controls a cut-off frequency changing unit, and changes the value of the cut-off frequency.

10 Claims, 5 Drawing Sheets

MAGNETIC RECORDING/REPRODUCING APPARATUS AND MAGNETIC RECORDING/REPRODUCING METHOD

BACKGROUND OF THE INVENTION

1) Field of the Invention

The present invention relates to a magnetic recording/reproducing apparatus and a magnetic recording/reproducing method that reproduce data recorded in a perpendicular magnetic recording disk, and more particularly to a magnetic recording/reproducing apparatus and a magnetic recording/reproducing method in which error rates are stabilized.

2) Description of the Related Art

Conventionally, a longitudinal magnetic recording system that records magnetism parallel to a disk surface had been widely used for recording systems of magnetic recording disks. However, to meet a demand for densification of recording volume, a perpendicular magnetic recording system that records magnetism in the direction perpendicular to a disk surface has been commercialized lately, for example, as disclosed in Japanese Patent Application Laid-Open Publication No. 2004-213896.

Since a head detected a perpendicular component of a magnetic field on a disk surface when reading out data recorded on the disk, it was equivalent to differentiation when information recorded by the longitudinal magnetic recording system was read out. Moreover, in a head preamplifier that served as an amplification processing unit to amplify a reproduced waveform outputted from the head, a bias current or a voltage was applied to the head to extract a variation in magnetoresistance of the head, and high-pass filters were used at both ends of the head to eliminate potential difference.

Here, since the reproduced waveform of the head has a differentiation characteristic in the longitudinal magnetic recording system, there was little effect on the error rate with respect to data transfer rate when cut-off frequencies of the high-pass filters are moderately low against the reproduced waveform band.

However, in the perpendicular magnetic recording system, a magnetic field on a disk is reproduced straight by the head. Therefore, reproduced signals have a direct current (DC) component, and their transfer rates vary depending on positions in radial direction on the disk. Accordingly, the reproduced waveform from the head varies according to the relation between the cut-off frequency of the high-pass filter in the head preamplifier and the data transfer rate, which results in a problem that influence upon the error rate occurs due to complication of a decryption system and an equalization error.

SUMMARY OF THE INVENTION

It is an object of the present invention to at least solve the problems in the conventional technology.

A magnetic recording/reproducing apparatus that reproduces data recorded in a perpendicular magnetic recording disk, according to the present invention, includes a head that reads out a state of data recorded on the perpendicular magnetic recording disk, a high-pass filter that eliminates a low frequency component in outputs from the head; and a cut-off frequency controlling unit that variably controls a cut-off frequency of the high-pass filter corresponding to any one of a data transfer rate and a position of the head or both.

A magnetic recording/reproducing method that reproduces data recorded in a perpendicular magnetic recording disk, according to the present invention, includes reading data recorded on the perpendicular magnetic recording disk with a head, eliminating a low frequency component in outputs at the reading, and variably controlling a cut-off frequency at the eliminating corresponding to any one of a data transfer rate and a position of the head or both.

The other objects, features, and advantages of the present invention are specifically set forth in or will become apparent from the following detailed description of the invention when read in conjunction with the accompanying drawings.

DETAILED DESCRIPTION

Exemplary embodiments of a magnetic recording/reproducing apparatus and a magnetic recording/reproducing method according to the present invention are explained in detail with reference to the accompanying drawings.

Figure 1:
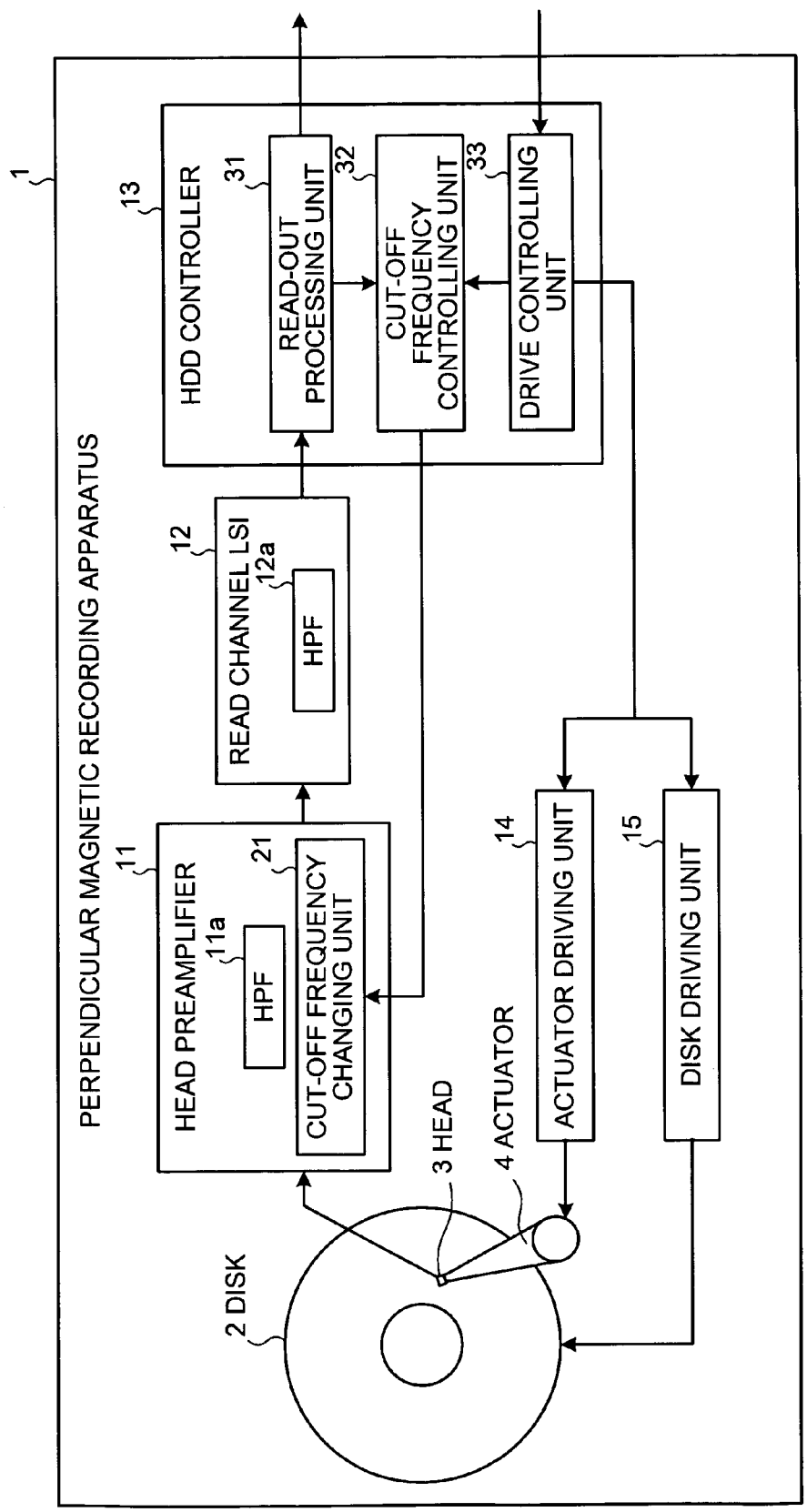
FIG. 1 is a schematic diagram representing a schematic structure of a perpendicular magnetic recording apparatus according to an embodiment of the present invention.

FIG. 1 is a schematic structural diagram to illustrate a schematic structure of a perpendicular magnetic recording apparatus according the present invention. As shown in FIG. 1, the perpendicular magnetic recording apparatus 1 includes, in its inside, a disk 2, a head 3, an actuator 4, a head preamplifier 11, a read channel LSI 12, a hard disk drive (HDD) controller 13, an actuator driving unit 14, and a disk driving unit 15.

The disk 2 is a recording medium that records data magnetically. The disk driving unit 15 is a driving unit that rotates the disk 2. Further, the head 3 is a reading unit that converts a magnetic state of the surface of the disk 2 into electric signals, and outputs the electric signals. The head 3 is arranged at the tip of the actuator 4 and moves on an arbitrary truck of the disk 2 by action of the actuator 4.

Signals outputted by the head 3 are amplified by an amplifying unit, or the head preamplifier 11, and sent to a signal processing unit, or the read channel LSI 12, where the signal is processed, and the processed signal is supplied to the HDD controller 13.

The HDD controller 13 is provided, in its inside, with a read-out processing unit 31, a cut-off frequency controlling unit 32, and a drive controlling unit 33. The read-out processing unit 31 sends out the signals processed by the read channel LSI 12 as an output of the perpendicular magnetic recording apparatus 1.

Further, the drive controlling unit 33 receives control instruction from other device (not shown) outside the perpendicular magnet recording apparatus 1 and controls actions of the actuator driving unit 14 and the disk driving unit 15.

Here, the head preamplifier 11 and the read channel LSI 12 are provided, in their inside, with high-pass filters 11a, 12a, respectively. In the perpendicular magnetic recording apparatus 1 of the present embodiment, the head preamplifier 11 is provided with a cut-off frequency changing unit 21 that changes frequency (cut-off frequency) to be eliminated by the high-pass filter 11a, and actions of the cut-off frequency changing unit 21 are controlled by the cut-off frequency controlling unit 32 provided inside the HDD controller 13.

Figure 2A:
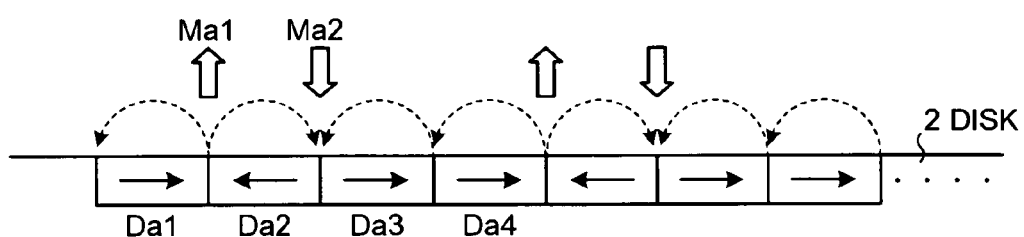
FIG. 2A is a detailed diagram illustrating reading out in a longitudinal magnetic recording system.

Control of cut-off frequency by this high-pass filter 11a is further explained. First, in the longitudinal magnetic recording system, magnetism in the direction horizontal to the surface of the disk 2 is recorded as shown in FIG. 2A. Specifically, in FIG. 2A, magnetism in the right direction is recorded in a data recording area Da1, and magnetism in the left direction is recorded in a data recording area Da2. Similarly, magnetism in the right direction is recorded in a data recording area Da3 and a data recording area Da4, respectively.

Therefore, on the surface of the disk 2, a magnetic field Ma1 in the upward direction is generated on the boundary between the data recording area Da1 and the data recording area Da2, and a magnetic field Ma2 in the downward direction is generated on the boundary between the data recording area Da2 and the data recording area Da3. On the other hand, the directions of the magnetism recorded in the data recording area Da3 and the data recording area Da4 are the same. Therefore, a magnetic field in the upward direction or downward direction is not generated on their boundary.

In this way, in the longitudinal magnetic recording system, a magnetic field in the upward direction or downward direction is generated on the boundary when the directions of recorded magnetism change, and the head detects the magnetic fields in the upward and downward directions. In other words, in the longitudinal magnetic recording system, the head was designed to detect differentiation of the directions of the magnetism recorded in a disk.

Figure 2B:
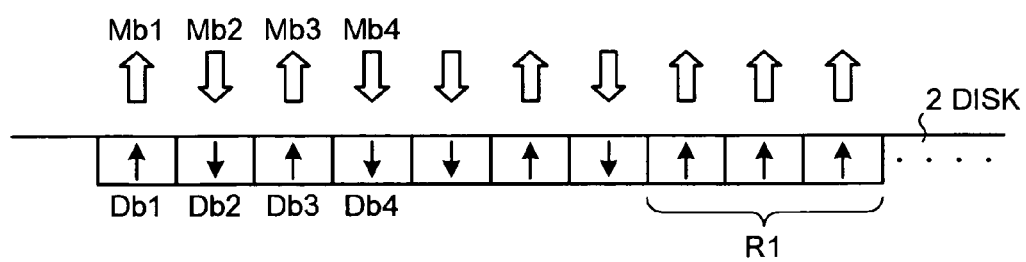
FIG. 2B is a detailed diagram illustrating reading out in a perpendicular magnetic recording system.

On the other hand, in the perpendicular magnetic recording system, magnetism in the direction perpendicular to the surface of the disk 2 is recorded as shown in FIG. 2B. Specifically, in FIG. 2B, magnetism in the upward direction Mb1 is recorded in a data recording area Db1. Magnetism in the downward direction Mb2 is recorded in a data recording area Db2. Similarly, magnetism in the upward direction Mb3 is recorded in a data recording area Db3, and magnetism in the downward direction Mb4 is recorded in a data recording area Db4.

Then, when the head reads the data, magnetic fields, generated over each data recording area, having the same direction as that of the magnetism recorded, are detected. That is, in the perpendicular magnetic recording system, the direction of recorded magnetism is detected straight or detected as it is.

Because of this, when magnetism recorded in the same direction continues as shown by a range R1 in FIG. 2B, and so forth, reproduced signals outputted by the head include a DC component. This DC component can be eliminated by passing through the high-pass filter 11a; however, the characteristic of the high-pass filter 11a varies depending on data transfer rates.

Figure 3:
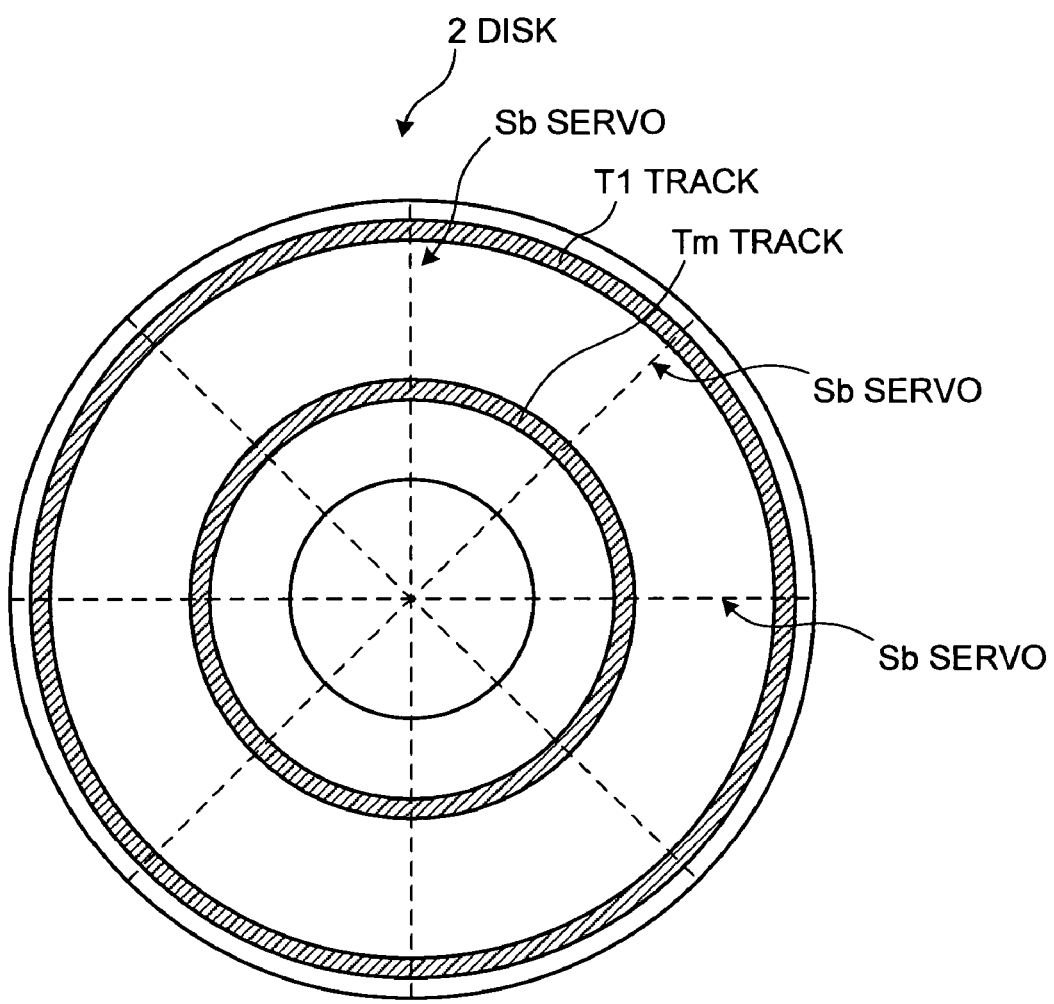
FIG. 3 is a detailed diagram illustrating a disk structure.

The disk 2 has tracks in concentric circles and servo areas in a radial form as shown in FIG. 3. Servos Sb are areas to record servo information each of which is used for position control of the actuator, and data to be written is recorded in the servo area for each track.

When reading of data is performed, relative speeds of the head to the tracks differ between on a track near the periphery of the disk 2 (for example, a track T1) and on a track near the center of the disk 2 (for example, a track Tm). Therefore, the transfer speed at the time of reading out from an outer track is faster compared to the transfer speed at the time of reading out from an inner track.

Thus, when a fixed high-pass filter is used in the perpendicular magnetic recording system as it used to be, the reproduced waveform varies between when data is read out from the inner track and when data is read out from the outer track. This not only makes a decryption system complicated due to a need to absorb the variation but also causes an occurrence of influence on error rates due to an equalization error.

Figure 4:
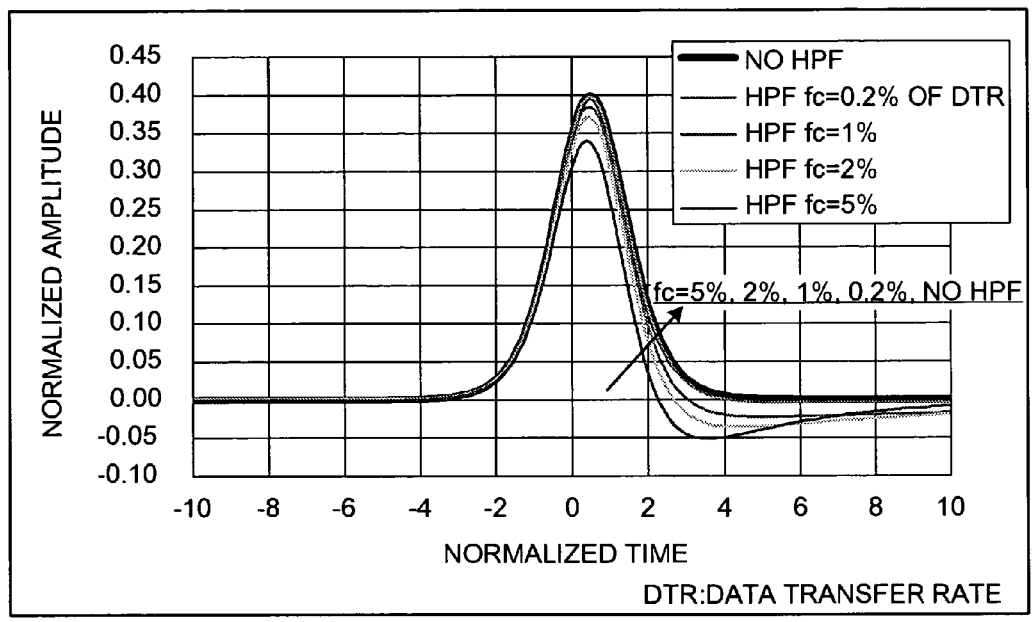
FIG. 4 is a detailed diagram illustrating an influence of cut-off frequency of a high-pass filter on impulse signals according to the embodiment of the present invention.
Figure 5:
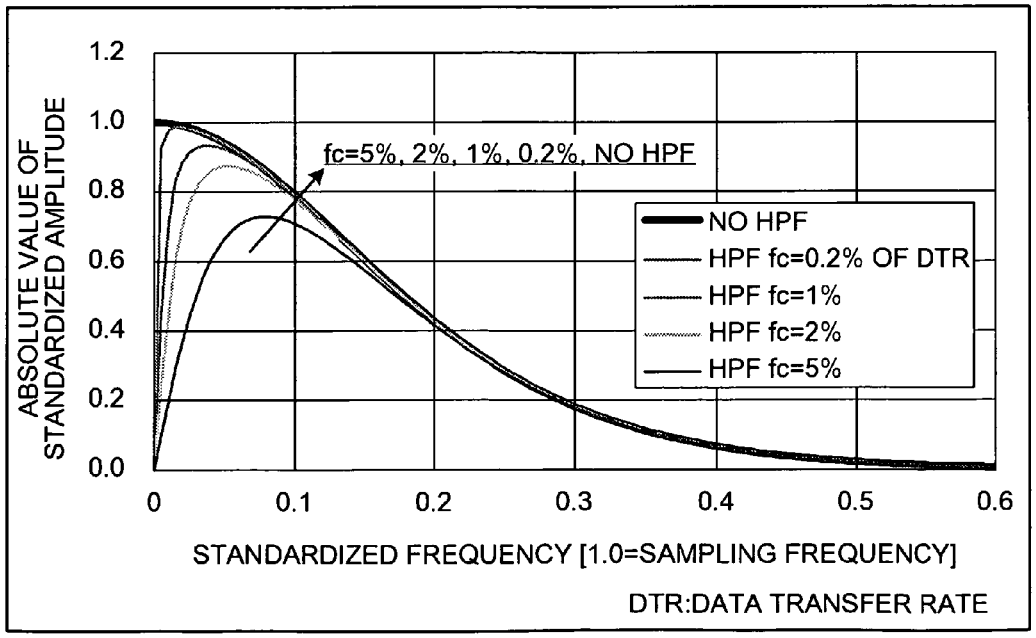
FIG. 5 is a detailed diagram illustrating frequency response according to the embodiment of the present invention.

More specifically, an influence of the cut-off frequency of the high-pass filter 11a on reproduced impulse signals of the head is shown in FIG. 4. In FIG. 4, characteristic curves show the reproduced impulse signals with high-pass filter (HPF) having cut-off frequency (fc) of 5% of data transfer rate (DTR), HPF having fc of 2% of DTR, HPF having fc of 1% of DTR, HPF having fc of 0.2% of DTR, and the reproduced impulse signal without HPF (NO HPF), respectively, in the order shown by the arrow. The frequency responses corresponding to the cut-off frequencies are shown in FIG. 5. In FIG. 5, characteristic curves show the frequency responses with high-pass filter (HPF) having cut-off frequency (fc) of 5% of data transfer rate (DTR), HPF having fc of 2% of DTR, HPF having fc of 1% of DTR, HPF having fc of 0.2% of DTR, and the frequency response without HPF (NO HPF), respectively, in the order shown by the arrow. As shown in FIG. 4 and FIG. 5, approximately the same waveform as that obtained without a high-pass filter 11a is reproduced when the cut-off frequency of the high-pass filter 11a is about 0.2% of the data transfer rate; however, the reproduced waveform varies significantly from the original waveform when the cut-off frequency of the high-pass filter 11a becomes about 5% of the data transfer rate.

The cut-off frequency controlling unit 32 controls the cut-off frequency changing unit 21 so that the ratio between the data transfer rate and the cut-off frequency becomes constant, for example, (data transfer rate):(cut-off frequency)=100:5, which leads to outputs of a uniform reproduced waveform regardless of data transfer rates.

More specifically, the cut-off frequency controlling unit 32 obtains a data transfer rate from the read-out processing unit 31 and controls the cut-off frequency of the high-pass filter 11a to a value adapted to the obtained transfer speed.

When a case in which the head is present in a servo area, that is, a case in which servo information is being read out is taken-into consideration, the servo information is needed to be reproduced immediately after writing data. However, when the cut-off frequency of the high-pass filter 11a is too low, a transient occurs due to the characteristic of the head preamplifier 11, which leads to a possibility that the servo information cannot be precisely read out.

Thus, when the head position is on a servo area, the high-pass filter 11a is controlled to have a cut-off frequency for servo that is different from that at the time of reading out of data. A judgment of whether "the head position is on a servo area" is specifically made by taking advantage of "whether a servo flag is on".

Figure 6:
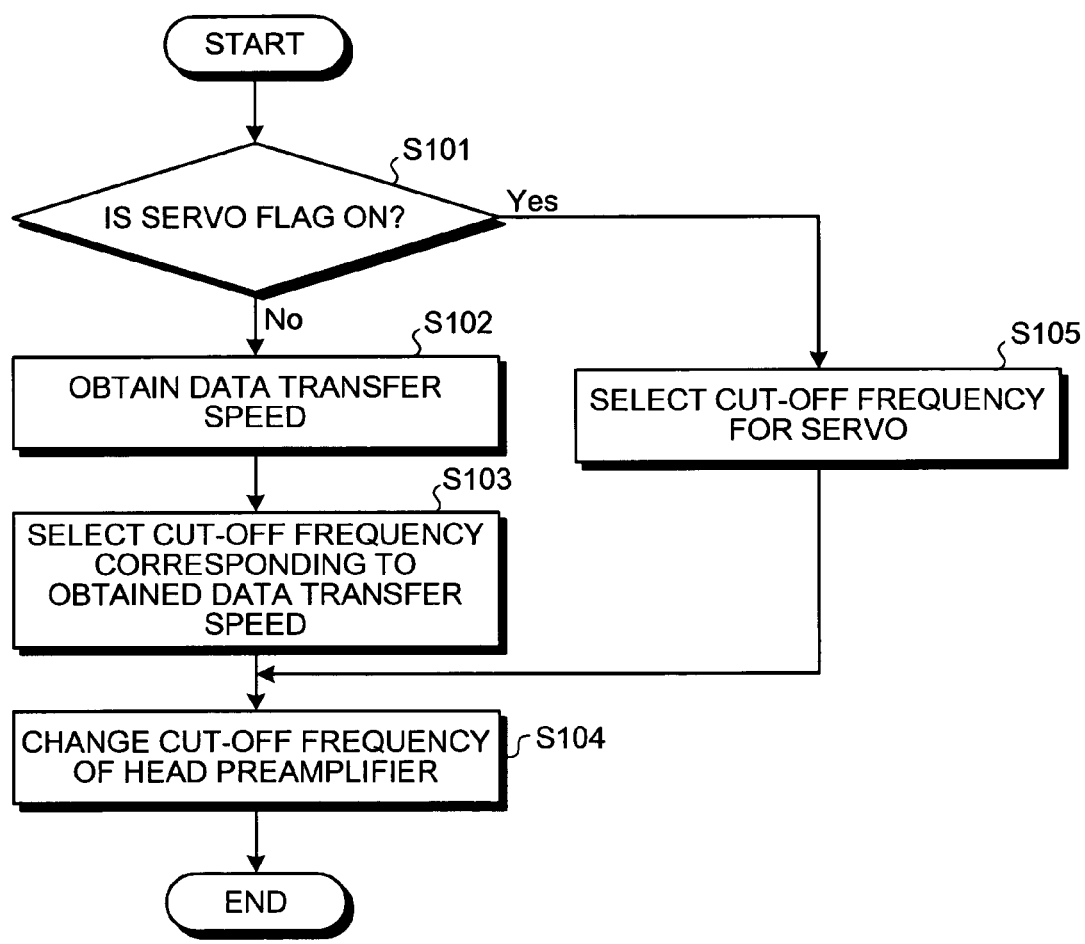
FIG. 6 is a flow chart illustrating a processing operation of the perpendicular magnetic recording apparatus according to the embodiment of the present invention.

Next, a processing operation of the perpendicular magnetic recording apparatus 1 is explained with reference to the flow chart of FIG. 6. The processing flow shown in FIG. 6 is the processing carried out repeatedly when the perpendicular magnetic recording apparatus 1 reads out data or servo information from the disk 2.

First, the cut-off frequency controlling unit 32 judges whether a servo flag is on based on the output from the read-out processing unit 31 (step S101). As the result, when the servo flag is on (step S101, Yes), the cut-off frequency controlling unit 32 selects a cut-off frequency for servo (step S105).

On the other hand, when the servo flag is off (step S101, No), the cut-off frequency controlling unit obtains a data transfer rate from the read-out processing unit 31 (step S102) and selects a cut-off frequency corresponding to the obtained data transfer rate (step S103).

Next, after the step S103 or the step S105 is completed, the cut-off frequency controlling unit 32 changes the cut-off frequency of the head preamplifier 11 to the value selected (step S104) and completes the processing.

As described in the foregoing, in the present embodiment, the reproduced waveforms of the head can be made uniform by controlling variably the cut-off frequency of the high-pass filter 11a corresponding to the data transfer rates. Therefore, not only can the same simple decryption system as that of the longitudinal magnetic recording system be used but also error rate degradation due to an equalization error can be avoided.

Further, when the servo flag is on, that is, when the head position is on a servo, servo information can be precisely read out by using a cut-off frequency for servo.

In the present embodiment, an example of the structure in which the cut-off frequency of the high-pass filter 11a of the head preamplifier 11 is variably controlled is explained. However, a structure in which a cut-off frequency of other than high-pass filter 11a is controlled, for example, the cut-off frequency of the high-pass filter 12a of the read channel LSI 12 is variably controlled, and so forth, can also give rise to a similar effect.

In another embodiment, the apparatus may be constituted such that high-pass filters 11a, 12a capable of controlling the cut-off frequencies are arranged in the head amplifier 11 and the read channel LSI 12, respectively, and each cut-off frequency is independently controlled corresponding to a data transfer rate or a head position.

According to the above embodiments, variably controlling at least one of the cut-off frequency of the high-pass filters 11a, 12a in at least one of the amplification processing unit 11 and the signal processing unit 12 results in uniform waveforms of the outputs generated. Therefore, the simple decryption method can be used and error rate degradation due to an equalization error can be avoided.

According to other embodiment, the cut-off frequency is variably controlled based on data transfer rates when data is being read out from the perpendicular magnetic recording disk 2, and a cut-off frequency different from that during data reading is used when servo information is being read out. Therefore, enhancement of accuracy in reading out the servo information can be available in addition to simple decryption method and avoidance of error rate degradation due to an equalization error.

According to the present invention, the decryption system is simplified and error rate degradation due to an equalization error can be avoided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A magnetic recording/reproducing apparatus that reproduces data recorded in a perpendicular magnetic recording disk, comprising:
   a head that reads out a state of data recorded on the perpendicular magnetic recording disk and outputs a signal that corresponds to the state read;
   a high-pass filter that eliminates a low frequency component from the signal output by the head; and
   a cut-off frequency controlling unit that variably controls a cut-off frequency of the high-pass filter corresponding to at least one of a data transfer rate and a position of the head,
   wherein the cut-off frequency controlling unit variably controls the cut-off frequency of the high-pass filter such that the ratio between the data transfer rate and the cut-off frequency becomes a constant value.

2. The magnetic recording/reproducing apparatus according to claim 1, wherein the high-pass filter is provided in an amplifying unit that amplifies the signal output from the head, and the cut-off frequency controlling unit variably controls the cut-off frequency of the high-pass filter provided in the amplifying unit.

3. The magnetic recording/reproducing apparatus according to claim 1, wherein the high-pass filter is provided in a signal processing unit that processes an amplified output signal of the head, and the cut-off frequency controlling unit variably controls the cut-off frequency of the high-pass filter provided in the signal processing unit.

4. The magnetic recording/reproducing apparatus according to claim 1, further comprising a second high-pass filter, wherein the high-pass filter is provided in an amplifying unit and the second high-pass filter is provided in a signal processing unit, and the cut-off frequency controlling unit variably controls the cut-off frequencies of the high-pass filter and the second high-pass filter.

5. The magnetic recording/reproducing apparatus according to claim 1, wherein the cut-off frequency controlling unit determines the cut-off frequency of the high-pass filter based on the data transfer rate when data is being read out from the perpendicular magnetic recording disk, and determines the cut-off frequency of the high-pass filter based on the head position when servo information of the perpendicular magnetic recording disk is being read out.

6. A magnetic recording/reproducing method that reproduces data recorded in a perpendicular magnetic recording disk, comprising:
   reading data recorded on the perpendicular magnetic recording disk with a head;
   eliminating a low frequency component in outputs at the reading; and
   variably controlling a cut-off frequency at the eliminating corresponding to at least one of a data transfer rate and a position of the head,
   wherein the variably controlling includes variably controlling the cut-off frequency at the filtering such that the ratio between the data transfer rate and the cut-off frequency becomes a constant value.

7. The magnetic recording/reproducing method according to claim 6, wherein the variably controlling includes variably controlling the cut-off frequency of filtering in amplifying an output of the reading.

8. The magnetic recording/reproducing method according to claim 6, wherein the variably controlling includes variably controlling the cut-off frequency of filtering in signal processing of a signal read and amplified.

9. The magnetic recording/reproducing method according to claim 6, wherein the variably controlling includes variably controlling cut-off frequencies of filtering in amplifying and signal-processing, respectively.

10. The magnetic recording/reproducing method according to claim 6, wherein the variably controlling determines the cut-off frequency of the filtering based on the data transfer rate when data is being read out from the perpendicular magnetic recording disk, and determines the cut-off frequency at the filtering step based on the head position when servo information of the perpendicular magnetic recording disk is being read out.

* * * * *